Dec. 22, 1953 I. KAPLAN 2,663,444

TAPE DISPENSER AND APPLICATOR

Filed Sept. 7, 1950 7 Sheets-Sheet 1

INVENTOR
Irving Kaplan
BY
J. Basseches
his ATTORNEY

Dec. 22, 1953 I. KAPLAN 2,663,444

TAPE DISPENSER AND APPLICATOR

Filed Sept. 7, 1950 7 Sheets-Sheet 2

INVENTOR
Irving Kaplan
BY
J. G. Bassiches
his ATTORNEY

Dec. 22, 1953 I. KAPLAN 2,663,444

TAPE DISPENSER AND APPLICATOR

Filed Sept. 7, 1950 7 Sheets-Sheet 3

INVENTOR
Irving Kaplan
BY J. Basseches
his ATTORNEY

Dec. 22, 1953 I. KAPLAN 2,663,444

TAPE DISPENSER AND APPLICATOR

Filed Sept. 7, 1950 7 Sheets-Sheet 4

INVENTOR
Irving Kaplan
BY
H. Bassches
his ATTORNEY

INVENTOR
Irving Kaplan
BY J. F. Basseches
his ATTORNEY

INVENTOR
Irving Kaplan
BY
J. Bassecher
his ATTORNEY

INVENTOR
Irving Kaplan
BY
J. B. Bassiches
ATTORNEY

Patented Dec. 22, 1953 2,663,444

UNITED STATES PATENT OFFICE 2,663,444

TAPE DISPENSER AND APPLICATOR

Irving Kaplan, Flushing, N. Y.

Application September 7, 1950, Serial No. 183,622

10 Claims. (Cl. 216—25)

This invention relates to a dispenser of tape, and more particularly to a dispenser of pressure sensitive adhesive tape and still more particularly to a tape applicator and tape severing device.

The present invention is a continuation in part of my applications Serial No. 72,612 filed January 25, 1949, now Patent Number 2,634,877 issued April 14, 1953, and Serial No. 139,953, filed January 21, 1950.

My invention has as its object the provision of a tape dispenser and tacking device employing pressure sensitive adhesive tape involving the stripping from a roll or superimposed layers of such tape, and including for use with a source of pressure sensitive adhesive tape in which the layers are related to each other to have a reduced stripping resistance, dispensing mechanism or feeders whose contact with the tape of pressure sensitive adhesive character to assure continuous feeding thereof without gumming or binding of the dispenser or feeding mechanism.

My invention is predicated upon inter-relating in a pressure sensitive adhesive tape dispenser mechanism, the resistance to unwinding the laminations of a tape of this character to the contacting force required to strip the tape without breakage or damage to the tape backing or adhesive layer and my invention has for its object the provision of novel tape feeder means under manual or power stripping force which will provide a supply of such tape substantially undefaced or unmarred and unaltered, including the direction of the normal pressure sensitive adhesive surface in contact with the dispenser mechanism, and/or cutter mechanism, without offsetting of the adhesive onto the mechanism or the requirement manually to reset the tape for each cyclical procedure of stripping and cutting.

Still more particularly, my invention involves the provision of a novel mechanism for handling pressure sensitive adhesive tape and to sever or cut a predetermined length thereof including provision for separating tape from the severing means whereby the tape may be pushed in a position beyond the severing means and thereby to provide a compact, simple and efficient tape dispensing and tacking mechanism.

Still more particularly, it is an object of my invention to provide in a dispenser and severing mechanism for handling pressure sensitive adhesive tape, and in combination therewith, tape handling means which will leave the tape unaltered and free from transference of the adhesive layer.

Still further it is an object of this invention to provide novel tape severing means in the handling of pressure sensitive adhesive tape in a manually operable tape dispenser and applicator.

Other objects of my invention reside in the provision of a tape dispenser and tacker operable by one hand whereby tape generally and a pressure sensitive adhesive tape specifically may have a predetermined length of tape fed therethrough and by the same manual operation, sever the same and apply the tape in position.

Still more particularly it is an object of my invention to provide a dispenser, cutter and applicator for tape generally and pressure sensitive adhesive tape specifically which will simplify the application of this material whereby single hand operation may serve to dispense, locate, apply and sever a predetermined length of such tape, to simplify the shelf marking, labeling or packaging of goods and to tack upon a selected surface a segment of tape.

Still more particularly it is an object of my invention to provide a hand operated portable tape dispenser whereby a predetermined length of pressure sensitive adhesive tape may be fed, severed and applied in position, without the necessity for removing from the severing mechanism accumulated adhesive and without defacing the tape to be applied, and to provide such a measured strip without employing the surface to which the tape is to be applied as a preliminary anchoring medium as an aid in the stripping of the tape from the roll.

Still more particularly it is an object of my invention to provide a positive feed fully automatic portable, single hand operated device in which a single motion of the hand strips, cuts and attaches a segment of pressure sensitive adhesive tape and without the aid of the surface as an anchor for stripping.

To attain these objects and such further objects as may appear herein or be hereinafter pointed out, I make reference to the accompanying drawings, forming a part hereof, in which—

Figures 1, 2, 3:
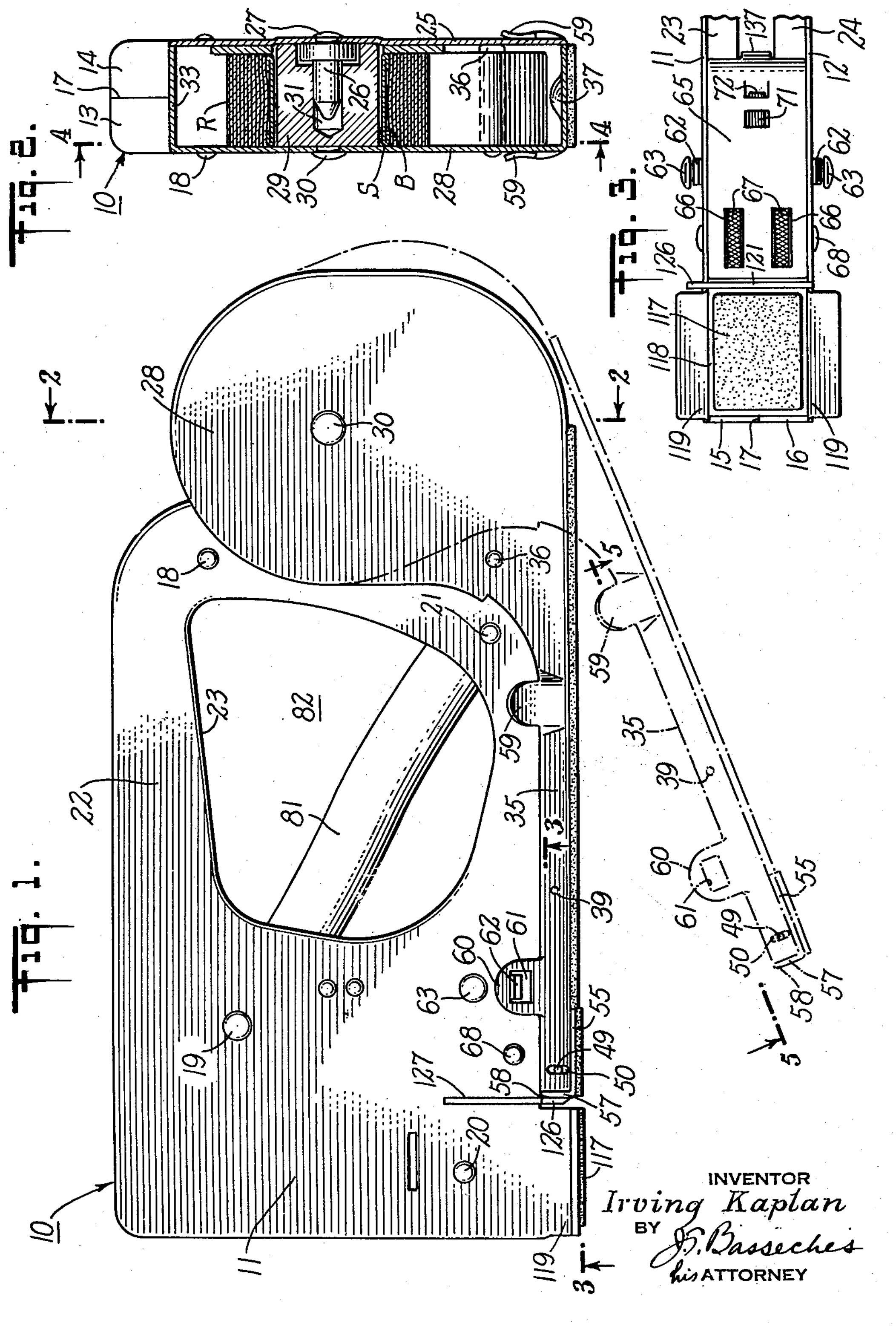
Figure 1 is a side elevation showing my device with a portion thereof positioned to expose the interior.
Figure 2 is a section taken on the line 2—2 of Figure 1.
Figure 3 is a view taken along the line 3—3 of Figure 1.
Figure 4:
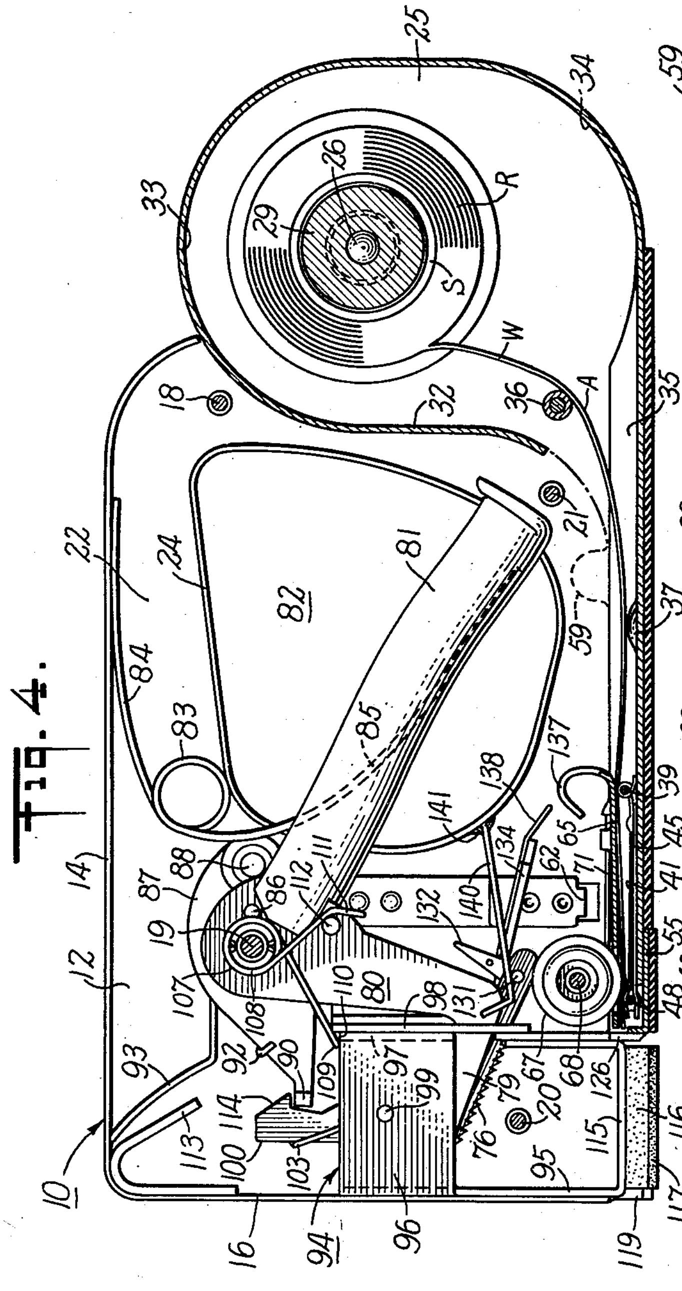
Figure 4 is a side elevation with the cover removed, taken along the line 4—4 of Figure 2.
Figure 5:
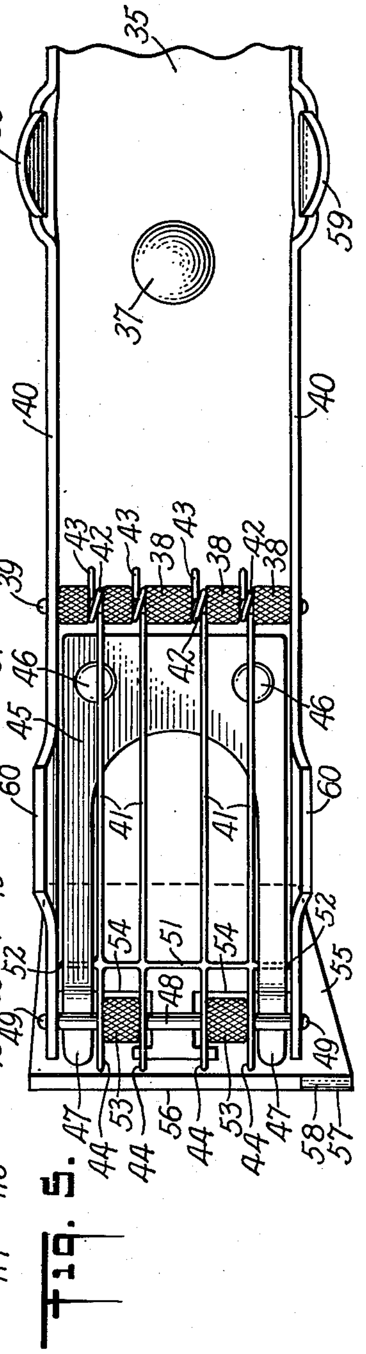
Figure 5 is a fragmentary magnified view taken in the direction of the arrows 5—5 of Figure 1.

Summarizing my invention, I provide a tape dispensing device which may be manipulated by one hand to dispense, apply and sever tape and attach the strip into position employing particularly self-sealing tape or that carrying a normally pressure sensitive adhesive coating, the manipulation in trigger fashion serving to strip a section of tape, particularly a roll of pressure sensitive adhesive tape without marring the tape. The device is further characterized by a mechanism which permits stripping a section of tape of indeterminate size before attaching or applying the same to a surface. The invention may further be summarized as providing a roll of tape whereby hand stripping may be effected without initially anchoring the tape up to a surface.

Making reference to the drawing, my device comprises a body member 10 made of a cover casing member 11 and a bottom casing member 12 having top flanges 13 and 14 of the top and bottom members, respectively, and end flanges 15 and 16. These flanges meet in butt-joint contact at the edge 17 comprising spacer members for the side walls. Riveted pins 18, 19, 20 and 21, having shouldered portions, serve to maintain the casing segments in spaced relation to each other as well as supports for the mechanism hereinbelow to be described. The body and casing of the cover are each formed with hand gripping apertures, forming together a handle 22 including inwardly directed flanges 23 and 24, the edges of which are spaced from each other and serve as a guide for an operating member, as will appear more clearly as this description proceeds.

The body casing member 12, rearwardly thereof, is formed with an extension plate 25 from which extends a tape roll supporting casing stud 26, headed at 27 in the extension plate 25. A tape casing 28 has riveted thereto a spool core 29, headed at 30 in the side wall of the casing, and is axially formed with a boring 31 which may be sleeved over the stud 26 for pivotal movement of the casing 28 on the stud 26. The casing 28 has a flange 32 which extends in irregular convolute form to provide an upper section 33 concentric with the stud 26 and otherwise eccentric at the heel 34, wherein it merges into an extended channel guide 35.

A roll of tape R which, in the preferred embodiment, is of the normally tacky pressure sensitive adhesive variety is mounted on the spool core 29, to have its tacky surface downwardly directed and its back surface or non-tacky surface guided over a rotatable spool 36. The leading strip W of the tape, with its adhesive A downwardly directed, is guided centrally along the channel 35 over a beaded portion 37 and over knurled rolls 38, mounted on the trunnion pin 39 in the upstanding walls 40 of the channel. The knurled rolls 38 extend substantially across the width of the channel and are spaced apart from each other by the spring fingers 41, comprising very thin wire having looped portions 42 about the pin 39 and anchoring tails 43 biasing the forward ends 44 thereof upwardly. Beneath the rows of spring fingers 41 there is provided a spring plate 45, riveted to the channel by the rivets 46. The spring plate 45 has forwardly directed fingers 47, resiliently and upwardly bearing against the cross pin 48, whose ends 49 are slidable in the transverse slots 50—see Figure 1.

Figure 6:
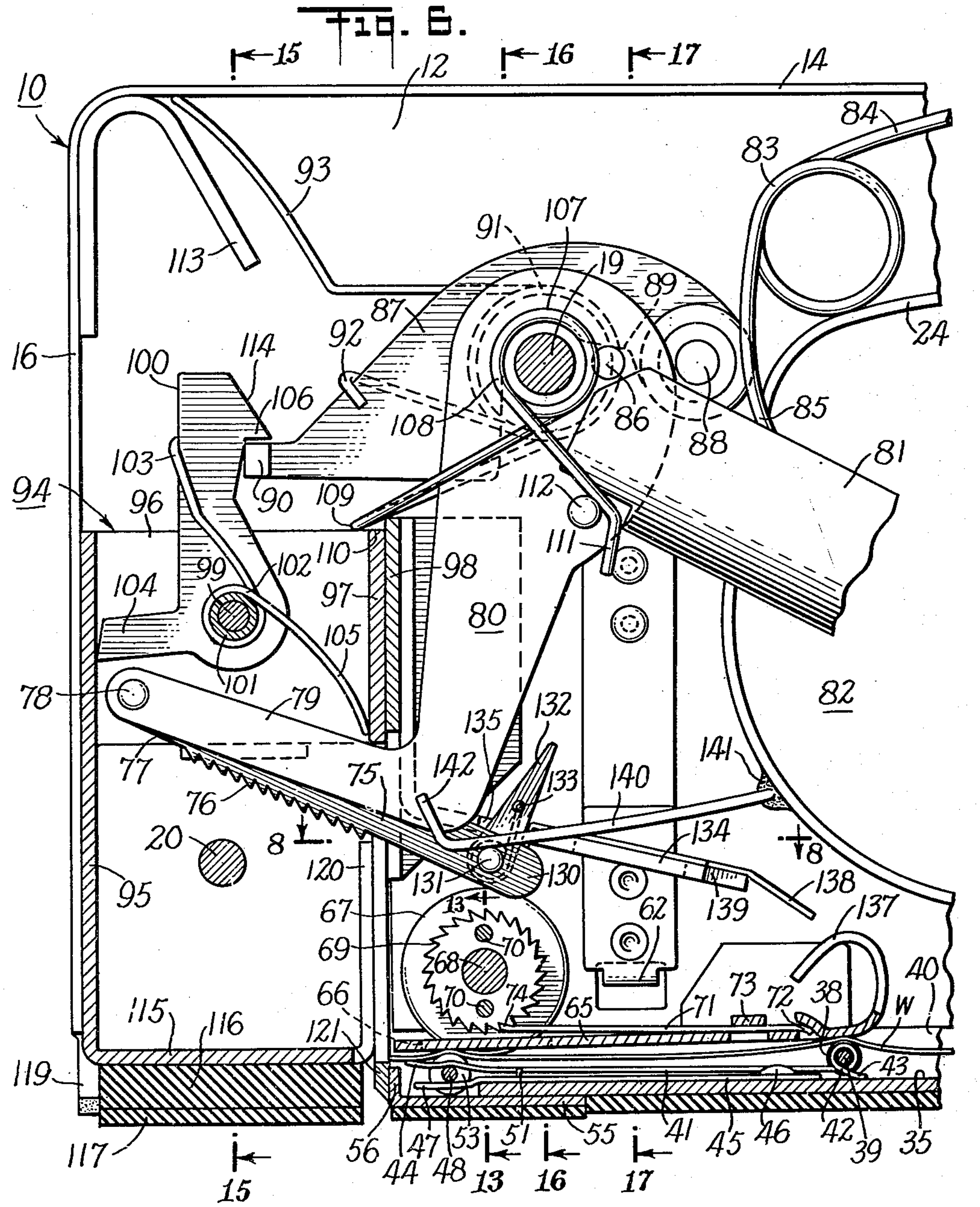
Figure 6 is a fragmentary magnified view similar to Figure 4.
Figure 7:
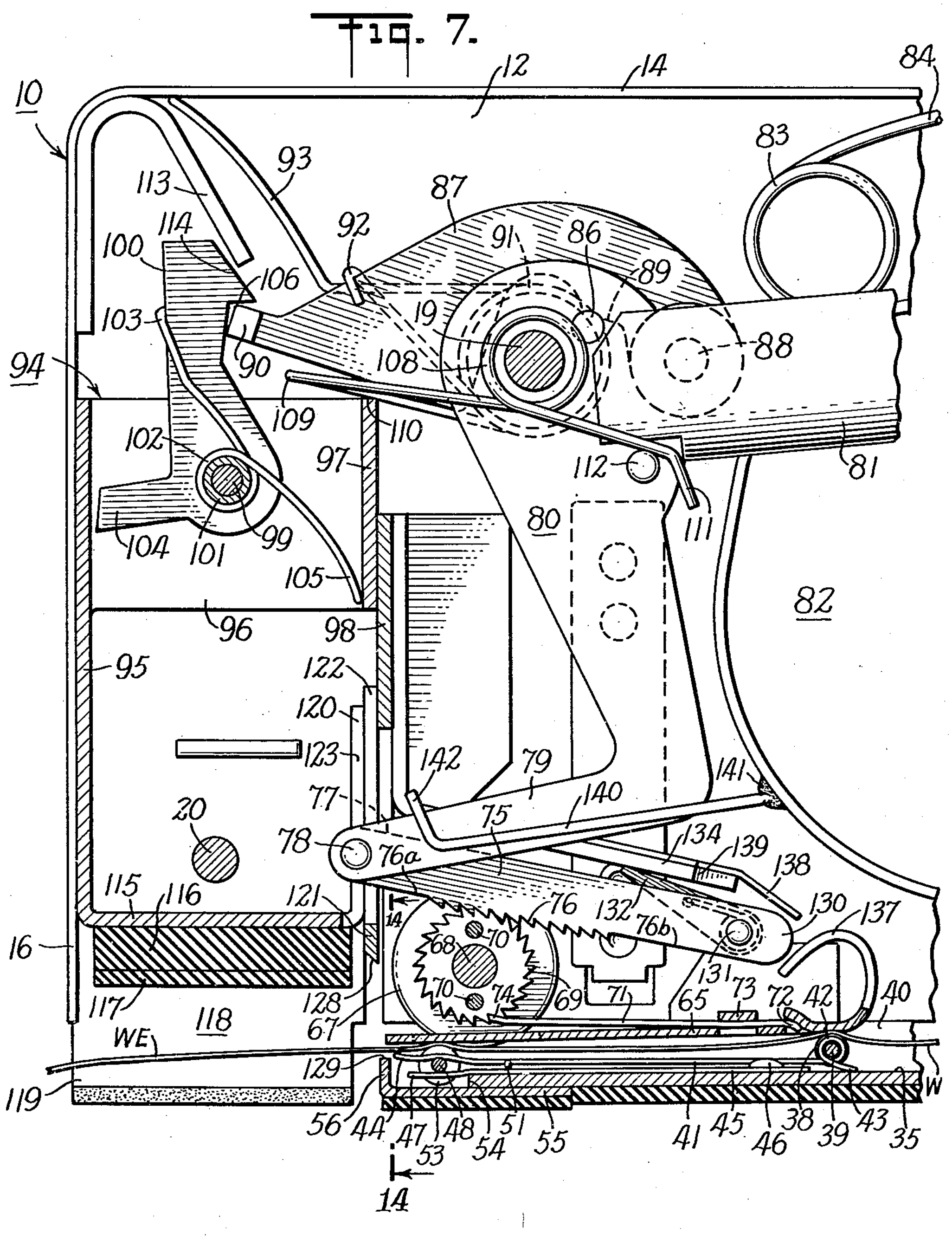
Figure 7 is a view similar to Figure 6, with the mechanism in a different position.
Figure 8:
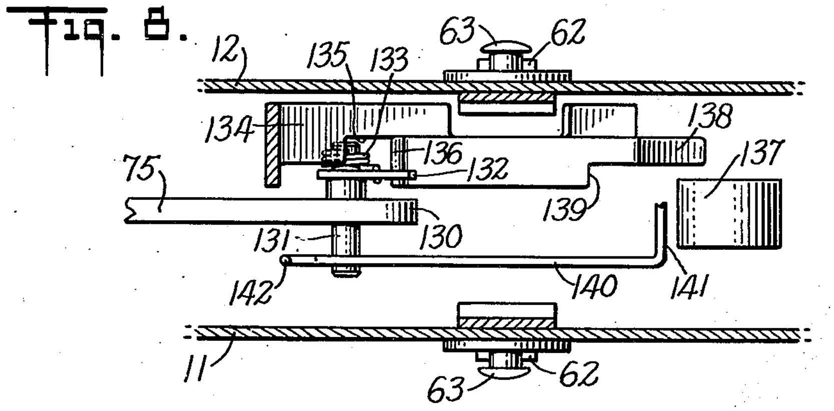
Figure 8 is a fragmentary section taken on the line 8—8 of Figure 6.
Figure 9:
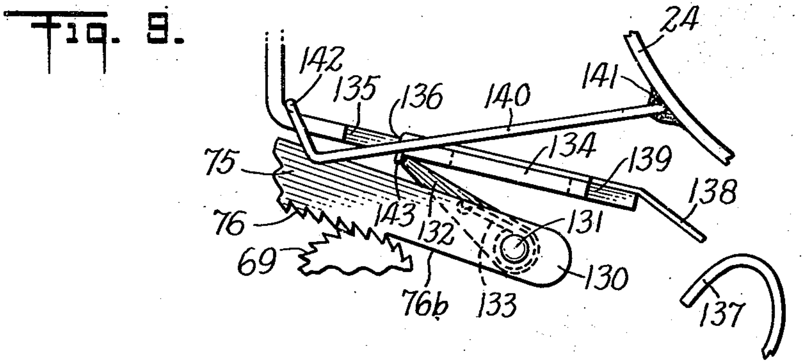
Figures 9 to 11 are fragmentary side elevations of the parts shown in Figure 8, in successive positions.
Figures 10, 11:
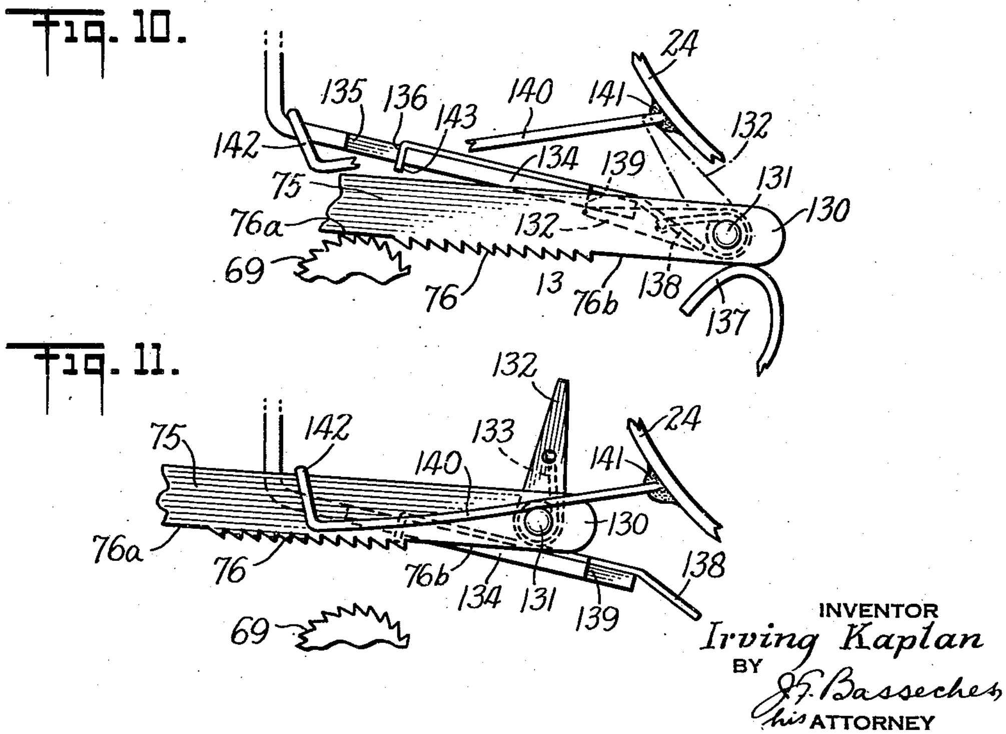
Figure 12:
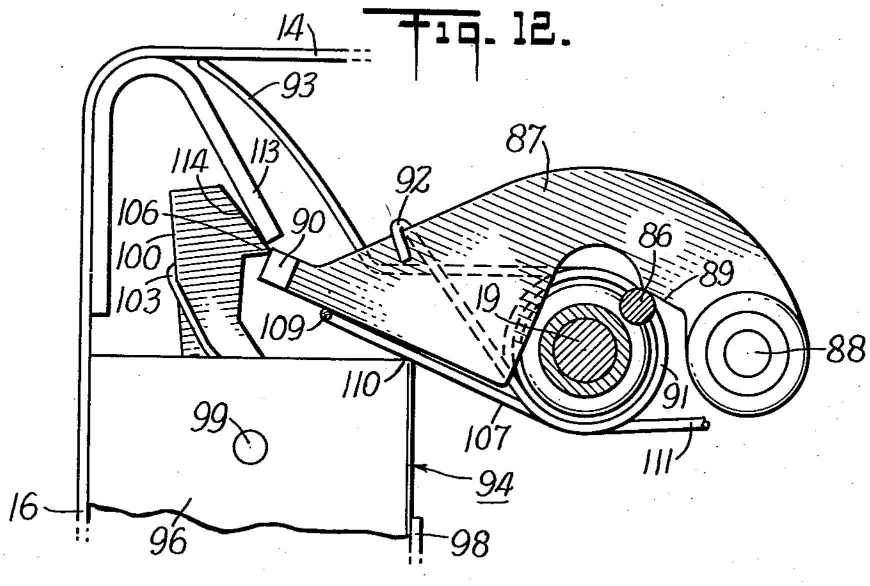
Figure 12 is a magnified view of the plunger release mechanism.
Figures 13, 14:
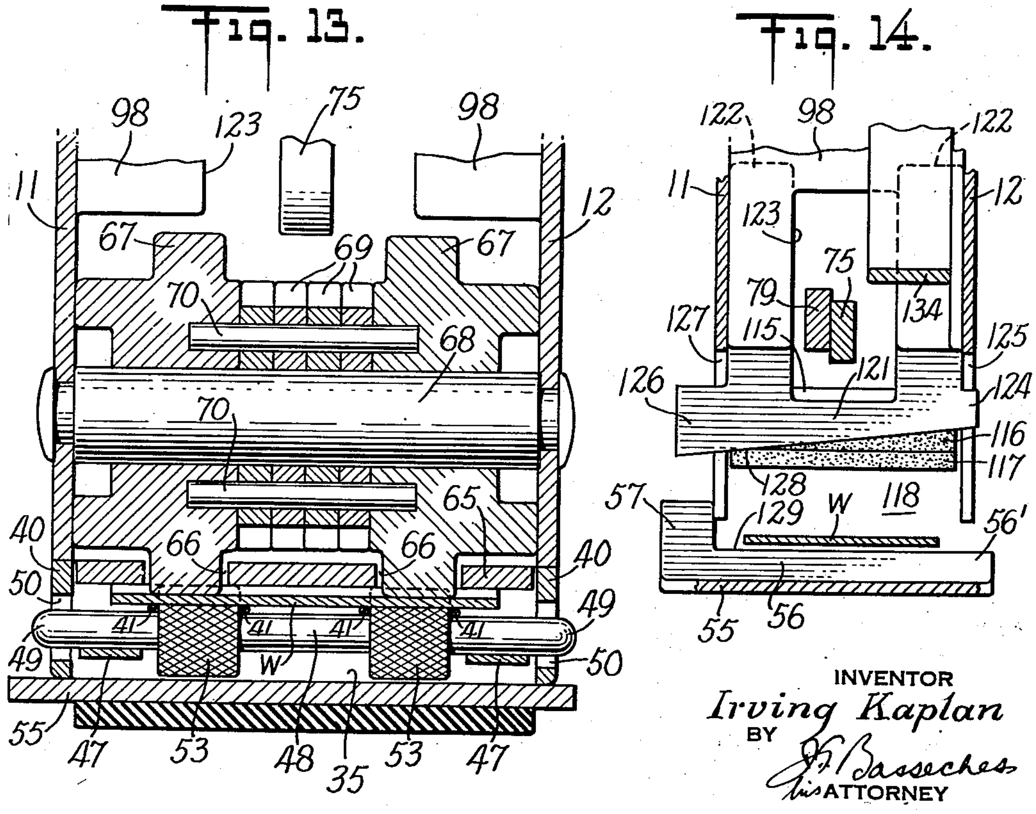
Figure 13 is an enlarged section taken on the line 13—13 of Figure 6.
Figure 14 is an enlarged section taken on the line 14—14 of Figure 7.
Figures 15, 16, 17:
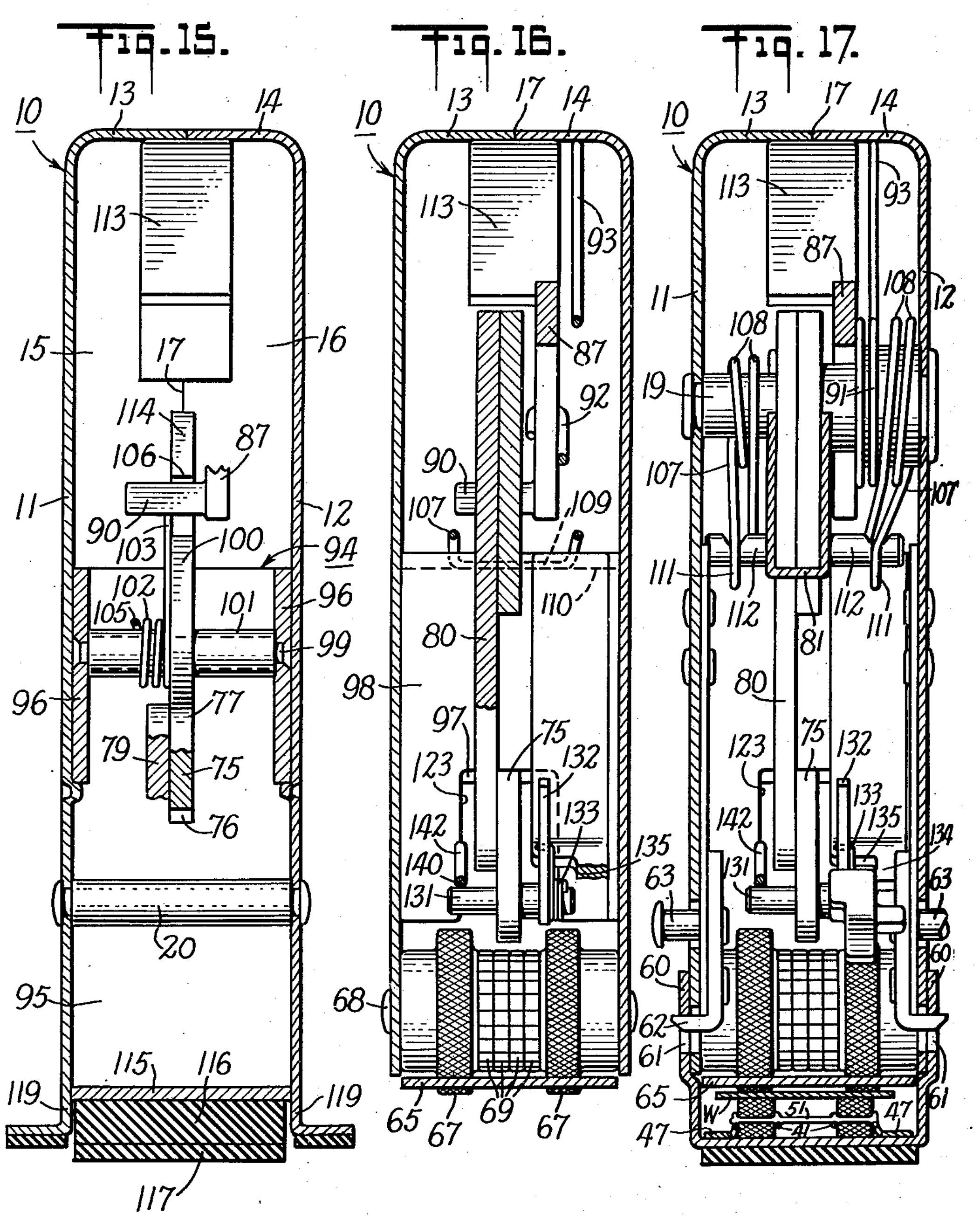
Figure 15 is a section taken on the line 15—15 of Figure 6.
Figure 16 is a section taken on the line 16—16 of Figure 6.
Figure 17 is a section taken on the line 17—17 of Figure 6.

The fingers 47 normally press the pin 48 upwardly away from the base of the channel against the tension of the spring fingers 44, there being provided a cross bar 51 joining fingers 41 passing above the fingers 47 and anchored at the ends 52 to press the spring fingers 41 against the pin 48. The pin 48 has rotatably mounted thereon the knurled feeder rolls 53, which are maintained in spaced relationship between pairs of the spring fingers 41. Edge cutouts 54 in the channel 35 provide clearance for the rolls 53, resiliently and rotatably to support the rolls 53 on the cross pin shaft 48, out of contact with the channel 35. The channel 35 has connected to it a strip 55 by a lap joint. The strip has an upwardly, angularly directed portion ground to provide a cutting blade 56, the edge of which merges into an upstanding wing 57, angularly directed away from the cutting edge and formed with a forwardly arched camming edge 58. The channel 35 may then be brought into bottom edge lapping position, there being tongues 59 and 60 for riding over the edges of the casing. Tongues 60 have cutouts 61 for engagement with the spring pressed latches 62. Buttons 63 extend through the casing walls 11 and 12 for depressing the latches 62 for disengagement with the cutouts 61. In this position, the channel is brought in position to direct the web back W against the guide plate 65, which is mounted transversely from the main casing section 12 and through spaced apertures thereof 66 there is projected the knurled driving rolls 67, rotatably mounted on the pin shaft 68, which is held in the front and rear casing by riveting. The driving rolls 67 are spaced to each side of the series of ratchet wheels 69, which latter are keyed to the driving rolls 67 by the locking pins 70. A spring leaf 71 is anchored at one end 72 in the guide plate 65 by the stamped out loop 73, to bias the end 74 against the ratchet wheel 69 and to act as a pawl to prevent counter-clockwise rotation of the ratchet wheel 69 when viewed in Figures 6 and 7.

The ratchet wheel is driven by the ratchet bar 75, and has a series of ratchet teeth 76 for matching engagement with the ratchet wheel 69. The ratchet bar has its end 77 pivoted on the pin 78 and is carried by the arm 79 of the crank arm 80, which is trunnioned on the pin 19. A manual power applying handle or lever 81 extends transversely to the branch 80 and is accessible through the aperture 82 defined by the flanges 24 previously described, and is in opposed hand gripping relation to the handle 22. A coiled spring 83 has its ends 84 and 85 biased in the channel outlining the handle 22 and 81, respectively, normally to spread the same from each other.

The lever arm 80 has a cross pin 86 serving as the driving member for a lever 87 whose rear end is pivoted on the pin 88. The pin 86 engages a face 89 to magnify the movement of the left finger 90 at the extreme end of the lever 87. A coiled spring 91 has a hooked end 92 engaging the lever 87 at one end. The opposite end 93 engages the flange of the casing normally to bias the lever 87 in constant contact with the pin 86, to act as a follower for this latter member. The finger 90 lies in the path of the plunger 94 which serves as a cutter and applicator. This latter plunger member comprises sheet metal shaped into a portion serving as a guide plate 95 whose upper end has cross branches 96 shaped to outline a hollow guide block by the inwardly directed flanges 97. The plunger is guided between the forward end flanges 15 and 16 of the casing and a partition 98 affixed to the casing wall. The cross arms 96 support a cross pin 99 on which is pivotally mounted the latch 100. A spacer tube 101 centrally positions the latch 100 in relation to the path of movement of the finger 90 as well as to pivot the same. A coiled spring 102 has a hooked end 103 thereof engaged to bias the latch normally so that the stop tail 104 is in engagement with the wall 95 to limit the pivotal movement of the latch to the erect position in one direction, the spring terminal 105 engaging the branch 97 for the spring biasing action described. The latch 100 has a pawl tooth 106 positioned for engagement by the finger 90 which is turned cross-wise for contact with the pawl tooth 106.

A double coiled spring 107 has the spaced loops 108 sleeved on the pin 19 to either side of the lever arm 80, at its hub, and the lever arm 87 lying to one side thereof. The closed loop portion thereof 109 bears on the block 96 at the edge 110. The terminal ends 111 of the spring are maintained in biased condition on the cross pin 112 and carried by the arm 80. The plunger 94 is thereby maintained under constant biasing position under the influence of the spring 107 when the members 81 and 22 are brought together.

In the limit approaching position the latch 100 is brought into engagement with the tripping arm 113 by engagement with the camming nose 114, to trip the latch from engagement with the finger 100 and release the plunger under the impelling action of the spring 107.

The plunger 94 has a bottom plate 115 formed with a pad 116 and an applicator layer 117 for projection in the throat 118 between the legs 119 which are covered with suitable pads, such as rubber or like non-marring material.

The plunger 94 is formed with spaced shoes 120 to which, at their outer face, is riveted the blade 121 carried on complementarily positioned branches 122 to outline, with the shoes 120, a clearance aperture 123 for the lever arm and rack bar 75 and 79 respectively, previously described. The knife 121 has an ear 124 extended therefrom, guiding the same in the vertical slot 125 in the body casing wall 12. The knife at its opposite end has an ear 126 guided in a slot 127 in the cover member 11.

The cutter 56 is slightly angularly positioned so that the leading edge comprising the camming portion 57 is first engaged by the ear 126. The trailing edge 124 of the movable knife 121 is guided in the slot 125 so that it is in close contact with the trailing edge 56′ of the knife 56, thereby bringing the knife edges 121 and 56 in biased cutting contact, in moving the blade edges 128 and 129 into cutting relationship.

With the construction described, it will be observed that a web of tape W is initially stretched out to extend the end WE in the throat 118 over the knife edge 129, the spaced fingers 44 restraining contact of the adhesive surface with the knife edge. The handle 81 may then be pressed to raise the plunger 94 out of the path of the throat, thereby raising the knife 121 with it. The ratchet bar 75 is thereupon projected through the aperture 123 over the ratchet wheel 69.

The ratchet bar 75, adjacent its nose portion 130, is provided with a guide pin 131 on which is mounted a pivotal pawl 132. The spring 133 normally biases the pawl clockwise. The pawl 132 lies in the path of a guide plate 134 and has a cutout 135 and leading edge 136 against which the pawl 132 presses as the rack arm 75 carrying the same moves toward the right (see particularly Figures 8 to 11). The reaction against the pawl 132 is to drive the teeth 76 of the rack arm 75 into positive engagement with the ratchet wheel 69 until the trailing portion 76*a* without teeth reaches the ratchet wheel. Driving engagement of the teeth 76 and the ratchet wheel continues until the leading nose portion 130 (with the leading portion 76*b* without teeth) engages the releasing cam 137 to disengage the pawl teeth and to stop the feed of the tape web and the load thereof and to raise the guide pin 131 over the spring guide strip 138. In this position the pawl 132 passes the notch 139, releasing the pawl 132. A cross wire spring 140, anchored by welding or brazing to the casing at the end 141, restrains escape of the pawl 132 under the biasing action of the spring 133. The forward end 142 of the cross wire 140 acts against the cross pin 131 in the left hand movement of the ratchet arm 75 as the pin 131 is first mounted to ride on top of the leaf 138 and to continue its movement on the upper surface of the guide strip 134, until the cross pin 131 reaches the notch 135 and the edge 136, whereupon the spring 140, at the end 142, acts against the pin 131 to urge this end of the ratchet arm 75 through the notch 135 to the under side of the guide plate 134, to complete the cycle.

Synchronized with the escape of the ratchet arm from engagement with the ratchet wheel in gripping the handle members 22 and 81 to each other is the upward movement of the plunger 94 to the point where the finger 90 is released from engagement from the pawl tooth 106, to impel the plunger under the influence of the spring 107 into the throat 118, in which position a length of tape is severed by the cutter comprising the engaging blades 56 and 121. The pad 117 strikes the severed segment WE and collapses it into engagement with any material on which the feet 119 may rest.

I find it desirable, in one embodiment of my invention, not only to feed a strip of tape resulting from one thrust of the ratchet bar 75 in engagement with the ratchet wheel 69, but with any predetermined length. For this purpose it is desirable to prevent escape of the plunger until the desired length of tape has been fed by the feed rolls 67 in engagement with the rollers 53. For this purpose, the guide plate 134 is formed with the stop 143. As the handle 81 is pumped to an intermediate position before tripping the latch 100, the pawl 132 engages the stop 143 on retraction, thereby restraining the downward movement of the plunger 94 into the throat 118, preventing cutting of the length of tape there positioned. Repeated movement of the handle 81, pumping-fashion, between the limits of the stop 143 and the release edge 139, will feed an intermediate length of tape until the handle is brought to a position to engage the camming edge of the latch 114 with the tripping edge 113, and the pawl is thereupon escaped past the edge 139, to permit a full return movement of the plunger actuating mechanism.

It will be understood that tape, particularly tape which is self-adhesive or that known to have pressure sensitive adhesive coating, may be fed between the feed roll 67 and the guide roll 53 without offsetting or marring the adhesive tape. Furthermore, the resilient mounting of the rolls 53 maintains the spaced finger 44 to urge the adhesive surface into disengaging relation to the knife 56, freeing the tape for feed after each cycle of use of the dispensing mechanism. Any adhesive contact with the fingers 44 is negligible and of less magnitude than the feeding action of the rolls 67 and 53 in engagement with the tape adhesive surface to prevent buckling or to require manipulation to first anchor the free end of the tape to be applied. It will be understood that a feature of my invention resides in combining the limited contact engagement of the feed rolls with the tape of pressure sensitive character convoluted in rolls in which the layers are supported with differential tension contact as by winding the tape upon a cylindrical spool S having a depressed circumferential belt B or by winding edged tape or winding tape deformed along its length to eliminate tension contact entirely across the width thereof.

Accordingly, my invention contemplates as novel the combination of mechanical stripping means for a roll of pressure sensitive adhesive tape convoluted with limited pressure contact in the windings thereof, and accordingly, I intend to claim as new as set forth in the claims the mechanical stripping of pressure sensitive adhesive tape from rolls of such tape which are convoluted with pressure contact for winding for less than the entire width of the tape as may be obtained by rewinding the tape upon a cylindrical spool S having a depressed circumferential belt B or that obtained by winding edged tape upon itself or otherwise deforming normally indistensible tape such as flat back paper with a pressure sensitive adhesive coating along its length to eliminate the tensioned contacting surface to a substantial portion less than the width of the entire tape.

Other features of my invention reside in the provision of a dispenser which may be operated by one hand for feeding an indeterminate length of tape and adhesively tacking the same into position whereby the tape may be attached to signs, posters, or for package or labeling purposes.

It will also be understood that while the primary advantages of my invention are illustrated in the entire combination, especially in the dispensing and the applying of pressure sensitive adhesive tape, it will be understood that all of the features of my invention need not be entirely assembled together and that segregated features may have utility independently and apart from other of the elements herein featured, and it is, therefore, intended to claim such segregated features as will be more particularly outlined in the appended claims.

Having thus described my invention and illustrated its use, what I claim as new and desire to secure by Letters Patent is:

1. Tape dispenser and applicator comprising a main casing, a horizontal pivot in the front thereof, a handle within said casing extending rearwardly from said pivot and into an aperture in said casing and adapted to be raised and lowered about said pivot, the top of said casing constituting a handhold, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife.

2. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife.

3. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a plurality of feed rolls biased upwardly toward said driving roll and below said tape, the total width of said feed rolls being substantially less than that of said tape.

4. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a latch on said plunger, a pivoted finger above said plunger adapted to engage said latch, the movement of said lever adapted to engage said finger and latch, and a tripping arm on said casing adapted to disengage said latch.

5. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a latch on said plunger, a pivoted finger above said plunger adapted to engage said latch, the movement of said lever adapted to engage said finger and latch, and a tripping arm on said casing adapted to disengage said latch at the end of the movement of said lever, said rack and gear feeding said tape at the intermediate portion of the movement of said lever, and means for retracting said lever before the end of said movement to feed tape without cutting.

6. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a guide plate for said rack the under side of which guides said rack to engage said gear during operation of said rack, a release cam at the rear of said guide to disengage said rack from said gear, and means for returning said rack to its initial position.

7. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a guide plate for said rack the under side which guides said rack to engage said gear during operation of said rack, a pawl pivoted on said rack adapted to engage the under side of said guide, a stop for said pawl on said guide, whereby retraction of said rack may be limited.

8. Tape dispenser and applicator comprising a main casing, a horizontal pivot in the front thereof, a handle within said casing extending rearwardly from said pivot and adapted to be raised and lowered about said pivot, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a portion of said lever extending into said plunger, the pivot of said rack being at the forward end of said portion.

9. Tape dispenser and applicator comprising a main casing, a horizontal pivot in the front thereof, a handle within said casing extending rearwardly from said pivot and into an aperture in said casing and adapted to be raised and lowered about said pivot, the top of said casing constituting a handhold, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a substantially horizontal roll stud fixed to said casing rearwardly of said aperture, said casing having a cut-out on one side at said stud to allow insertion of a roll of tape, a tape casing covering said cut-out and pivotally mounted on said stud.

10. Tape dispenser and applicator comprising a main casing, a horizontal pivot in the front thereof, a handle within said casing extending rearwardly from said pivot and into an aperture in said casing and adapted to be raised and lowered about said pivot, the top of said casing constituting a handhold, a lever extending downwardly from said pivot, said handle being fixed thereto, a rack pivoted to said lever, a driving roll for said tape, a gear fixed to said driving roll and adapted to mesh with said rack, a roll support at the rear of said handle in said casing, means for guiding tape to said driving roll, a reciprocatable plunger and knife in front of said driving roll, said driving roll adapted to feed said tape into the path of said plunger and knife, a substantially horizontal roll stud fixed to said casing rearwardly of said aperture, said casing having a cut-out on one side at said stud to allow insertion of a roll of tape, a tape casing covering said cut-out and pivotally mounted on said stud, a channel guide extending forwardly from said tape casing under said driving and feed rolls and forming the bottom of said applicator.

IRVING KAPLAN.

References Cited in the file of this patent

UNITED STATES PATENTS

| Number | Name | Date |
|---|---|---|
| 337,286 | Sandmann | Mar. 2, 1886 |
| 994,081 | Lipes | May 30, 1911 |
| 1,067,541 | Palmgren | July 15, 1913 |
| 1,371,677 | Frederick | Mar. 15, 1921 |
| 1,652,715 | Hanscom | Dec. 13, 1927 |
| 1,664,568 | Metzner | Apr. 3, 1928 |
| 1,870,197 | Sibley | Aug. 2, 1932 |
| 2,073,429 | Specher | Mar. 9, 1937 |
| 2,209,453 | Gordon | July 30, 1940 |
| 2,361,483 | Lang | Oct. 31, 1944 |
| 2,569,101 | Hoppe | Sept. 25, 1951 |